United States Patent
Xie et al.

(10) Patent No.: US 10,180,943 B2
(45) Date of Patent: Jan. 15, 2019

(54) GRANULAR PARTIAL RECALL OF DEDUPLICATED FILES

(71) Applicant: Microsoft Corporation, Redmond, WA (US)

(72) Inventors: Ping Xie, Redmond, WA (US); Chun Ho Cheung, Redmond, WA (US); Kashif Hasan, Snoqualmie, WA (US); Abhishek Gupta, Seattle, WA (US); Ran Kalach, Bellevue, WA (US); Daniel Hefenbrock, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 13/781,585

(22) Filed: Feb. 28, 2013

(65) Prior Publication Data

US 2014/0244601 A1   Aug. 28, 2014

(51) Int. Cl.
*G06F 17/30* (2006.01)

(52) U.S. Cl.
CPC .. *G06F 17/30117* (2013.01); *G06F 17/30156* (2013.01)

(58) Field of Classification Search
USPC ........................................................ 707/692
See application file for complete search history.

(56) References Cited

U.S. PATENT DOCUMENTS

| | | | |
|---|---|---|---|
| 7,613,750 B2 † | 11/2009 | Valiyaparambil | |
| 7,814,149 B1 | 10/2010 | Stringham | |
| 8,140,491 B2 | 3/2012 | Mandagere et al. | |
| 8,140,821 B1 * | 3/2012 | Raizen | G06F 11/1448 707/637 |
| 8,321,648 B2 | 11/2012 | Condict | |
| 8,380,681 B2 | 2/2013 | Oltean et al. | |
| 8,645,335 B2 | 2/2014 | Gupta et al. | |
| 9,639,543 B2 | 5/2017 | Li et al. | |
| 2002/0087822 A1 * | 7/2002 | Butterworth | 711/170 |
| 2006/0075007 A1 * | 4/2006 | Anderson | G06F 3/0608 |
| 2008/0195680 A1 * | 8/2008 | Daynes | G06F 12/0276 |
| 2009/0198704 A1 * | 8/2009 | Landberg | G06F 17/30091 |
| 2009/0271402 A1 * | 10/2009 | Srinivasan | G06F 17/3015 |

(Continued)

OTHER PUBLICATIONS

"Backup and Restore of Data Deduplication-Enabled Volumes (Windows)", Retrieved on: Feb. 1, 2013, Available at: http://msdn.microsoft.com/en-us/library/windows/desktop/hh769304%28v=vs.85%29.aspx, 5 pages.

(Continued)

*Primary Examiner* — Muluemebet Gurmu
(74) *Attorney, Agent, or Firm* — The Watson I.P. Group, PLC; Vladan M. Vasiljevic

(57) ABSTRACT

The subject disclosure is directed towards partially recalling file ranges of deduplicated files based on tracking dirty (write modified) ranges (user writes) in a way that eliminates or minimizes reading and writing already-optimized adjacent data. The granularity of the ranges does not depend on any file-system granularity for tracking ranges. In one aspect, lazy flushing of tracking data that preserves data-integrity and crash-consistency is provided. In one aspect, also described is supporting granular partial recall on an open file while a data deduplication system is optimizing that file.

20 Claims, 9 Drawing Sheets

(56) References Cited

U.S. PATENT DOCUMENTS

| | | | | |
|---|---|---|---|---|
| 2010/0125583 | A1* | 5/2010 | Casper | G06F 17/30067 707/745 |
| 2010/0274772 | A1† | 10/2010 | Samuels | |
| 2010/0274980 | A1* | 10/2010 | Stringham | G06F 11/1441 711/156 |
| 2011/0202329 | A1† | 8/2011 | Goodnight | |
| 2011/0270810 | A1* | 11/2011 | Dinkar | G06F 17/30156 707/692 |
| 2012/0158672 | A1 | 6/2012 | Oltean et al. | |
| 2012/0158675 | A1 | 6/2012 | Gupta et al. | |
| 2012/0166448 | A1* | 6/2012 | Li | G06F 17/3007 707/747 |
| 2012/0233417 | A1 | 9/2012 | Kalach et al. | |
| 2012/0290537 | A1 | 11/2012 | Smith et al. | |
| 2013/0018851 | A1 | 1/2013 | Jayaraman et al. | |
| 2013/0097380 | A1* | 4/2013 | Colgrove | G06F 17/30159 711/118 |

OTHER PUBLICATIONS

Johnson, Scott M., "Introduction to Data Deduplication in Windows Server 2012", Published on: May 20, 2012, Available at: http://blogs.technet.com/b/filecab/archive/2012/05/21/introduction-to-data-deduplication-in-windows-server-2012.aspx, 10 pages.

"International Search Report & Written Opinion for PCT Patent Application No. PCT/US2014/018457", dated Jun. 6, 2014, Filed Date: Feb. 26, 2014, 10 Pages.

"First Office Action and Search Report Issued in Chinese Patent Application No. 201480010936.0", dated Jan. 2, 2018, 13 Pages.

"Second Office Action Issued in Chinese Patent Application No. 201480010936.0", dated Sep. 5, 2018, 17 Pages.

\* cited by examiner
† cited by third party

GRANULAR PARTIAL RECALL OF DEDUPLICATED FILES

BACKGROUND

Data optimization (sometimes referred to as data deduplication) refers to reducing the physical amount of bytes of data that need to be stored on disk or transmitted across a network, without compromising the fidelity or integrity of the original data. By reducing the resources needed to store and/or transmit data, data optimization thus leads to savings in hardware costs (for storage) and data-managements costs (e.g., backup). As the amount of digitally stored data grows, these cost savings become significant.

Data optimization typically uses a combination of techniques for eliminating redundancy within and between persistently stored files. One data deduplication technique operates to identify identical regions of data in one or multiple files, and physically store only one unique region (chunk), while maintaining a reference to that chunk in association with the file. Another optimization technique is to mix data deduplication with compression, e.g., by storing compressed chunks.

The data of optimized/deduplicated files are thus stored in chunks or compressed chunks in a chunk store, where the files themselves are left as "stubs" comprising references to the chunks. When a user or an application needs to access a deduplicated file, a deduplication engine brings the data back into memory (referred to as rehydration) or to disk (referred to as recall). When a user or an application modifies that data, the old optimized data needs to be recalled/rehydrated to ensure data consistency and integrity.

The process of rehydration or recall introduces latency in data access because of the need to (possibly) decompress chunks, because of file fragmentation that is introduced by chunking, and because of the chunk store's location/implementation. Full file recall introduces high latency and relatively considerable I/O overload. When the file is large, the latency and resource consumption problems worsen.

Further, when a full large file has been recalled, the deduplication engine may need to again deduplicate the file. This requires a lot of resources and affects overall data deduplication throughput, which is also a challenge considering the large amount of data a typical deduplication system needs to manage.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which a granular partial recall mechanism is configured to maintain information in association with a file that tracks which range or ranges of file data are dirty ranges (e.g., because of a data write) relative to clean ranges, including clean data in a chunk store. Each dirty range has a size that is independent of file-system range tracking granularity.

In one aspect, there is described tracking which ranges of a partially recalled file are dirty in one or more tracking data structures. The one or more tracking structures may be lazily flushed from volatile memory to non-volatile memory based upon one or more flushing criteria.

In one aspect, there is described optimizing an open file including using data that tracks which range or ranges of a file are dirty and which are clean. Only the clean ranges are truncated at the end of optimization.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

U.S. patent application Ser. No. 12/970,848 (hereby incorporated by reference) is generally directed towards recalling to disk only ranges of an optimized file, or partial recall, to mitigate the performance penalty and latency of full file recall. While this works extremely well in many instances, the granularity of the partial recall is dictated by the file-system range-tracking granularity (e.g., 64 KB in case of NTFS sparse files), thereby still incurring high latency and IOPS (Input/Output Operations per Second) waste in the case of small random writes. Furthermore, the technology described therein uses a file-system and disk flush on every write, adding to the latency and IOPS overhead. These characteristics limit the ability of that partial recall solution to support workloads with small read/write profiles, such as VDI (Virtual Desktop Infrastructure) or other Hyper-V (hypervisor) scenarios.

Various aspects of the technology described herein are generally directed towards more fine-grained (granular) partial recall, based upon tracking data ranges written by the application, that is, "dirty" ranges, in which the granularity of a tracked data range does not depend on any file-system granularity of range tracking. As will be understood, such a more fine-grained granular partial recall avoids the need to read data from the chunk store while writing in-place new data (avoids copy-on-write) and thereby reduces latency and IOPS issues.

Further provided is a delayed-flush mechanism that preserves data integrity and crash consistency, without needing a flush on every write, thereby saving even more IOPS and reducing the latency of writes. In one aspect, there is also described the ability to support granular partial recall while a data deduplication solution is optimizing a file, basically allowing a data deduplication solution to optimize open files, while supporting files that are being modified by the user/application while the deduplication system is optimizing them.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
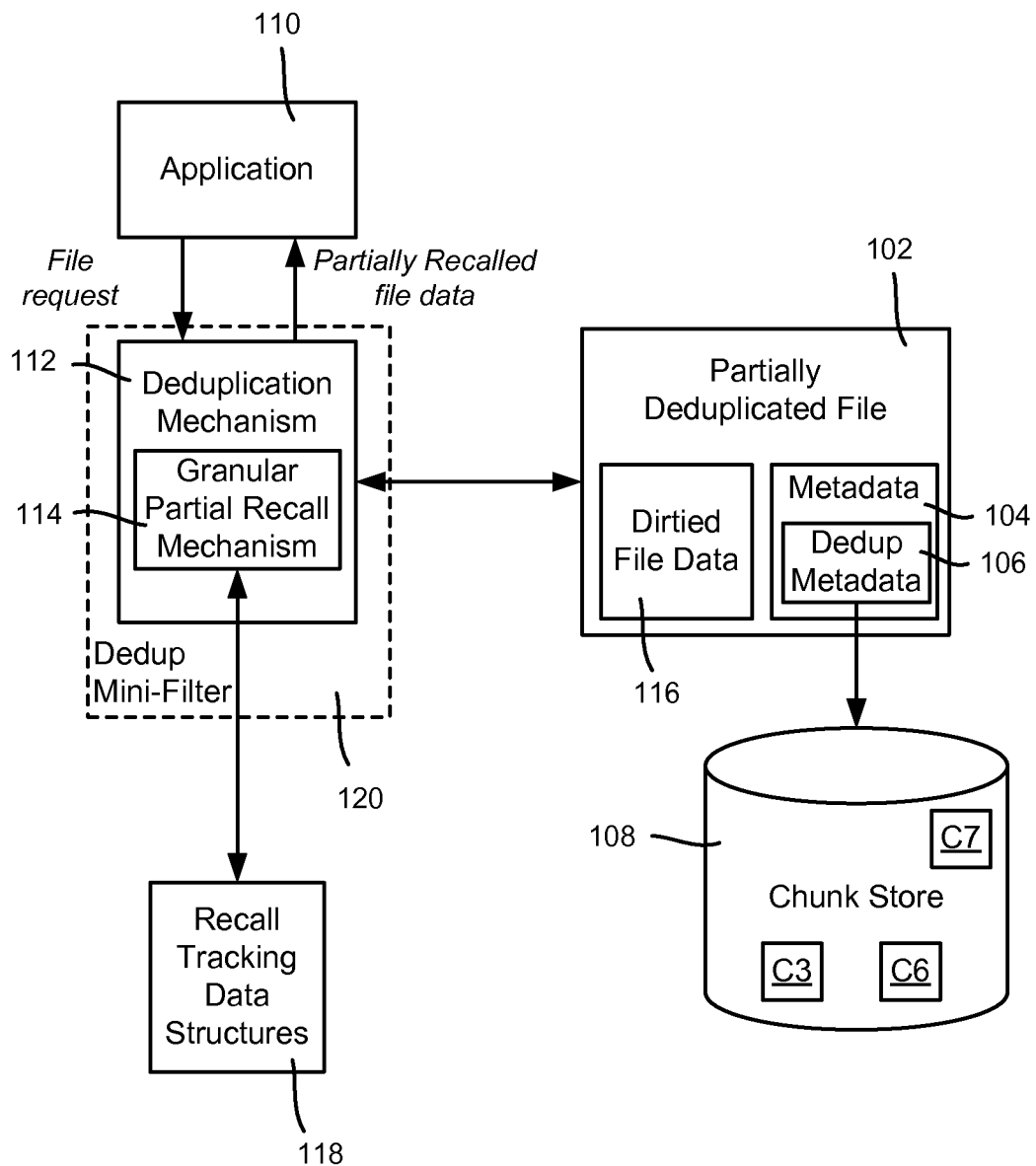
FIG. 1 is a block diagram representing example components for recalling ranges of a deduplicated file into a partially deduplicated file and/or accessing the data of a partially deduplicated file, according to one example embodiment.

FIG. 1 shows example concepts of granular partial recall with respect to a deduplicated file 102. In general, when a file is fully deduplicated, the file is associated with metadata 104 including deduplication (dedup) metadata 106 that maps the file's chunks (e.g., C3, C6 and C7) in the chunk store 108 back to the logical file. For example, with full deduplication, when an application 110 requests to read from the file, a deduplication mechanism 112 (e.g., implemented in a file system filter) accesses the referenced chunks (or chunk if only one) in the chunk store 108, and returns the chunks as recalled file data into memory, after any decompression as appropriate. From the perspective of the application 110, the data is intact, and thus except for latency the user of the application 110 does not know or care whether the file was ever deduplicated or not.

There are one or more operations that cause a file to change from being in a deduplicated state to a non-deduplicated state. This includes when a user or process writes to the file, such that the modified file data at the written offset location no longer matches the chunk or chunks that otherwise contain the "clean" data. Fully recalling the entire file to support such a file modification is often inefficient. The aforementioned U.S. patent application Ser. No. 12/970,848 provides for a more efficient "partial recall" operation that only recalls parts of the file, but as described above, has various inefficiencies in some scenarios.

As described herein, a granular partial recall mechanism 114 is provided that tracks dirty ranges of data, where dirty ranges correspond to writes, and are ranges allocated on the file and tracked by the deduplication system. This leaves the deduplicated file in a partially deduplicated state (the partially deduplicated file 102), containing dirty (written) file data 116 as well as references to the clean data, e.g., in chunks in the chunk store. An example granularity of a tracked dirty range of file data may be aligned on 512 byte boundaries, for example (although smaller or larger alignment boundaries may be used in a given implementation). The granularity is independent of file system range tracking granularity, and thus in general may be significantly more fine-grained.

The data in the dirty ranges contain the written data, and if this written data written is aligned with the partial-recall alignment (e.g., 512 bytes by default), then no data needs to be recalled from the chunk store for this range. If the file-modification (the "write") is not aligned, then the edges (any data before and/or after the dirty data) are recalled from the chunk store so that the file data range is aligned; the dirty range in this situation contains both old data (in the unaligned edge or edges from the chunk store) and the written data. Note that some data writes (e.g., Hyper-V writes) are sector-aligned, whereby no recall is needed for tracking dirty ranges. Notwithstanding, as used herein, a "recalled" range refers to a dirty range, because the dirty data is in the file, whether or not any actual recall from the chunk store took place.

For example, in FIG. 1, consider that a range of 512 bytes is dirty because at least some of its corresponding data was written to (dirtied) since the last optimization. To track this range, the deduplication metadata 106 and recall tracking data structures 118 (described below with reference to FIGS. 2 and 3) are updated to reflect this partial recall state so as to know that the file 102 contains the dirty data, and so as to no longer use the chunk store for this now-outdated (with respect to this file) range of data.

Thus, granular partial recall in general refers to tracking which range or ranges of the file have been written (are dirty) and which remain in clean. A file thus may exist in a non-deduplicated state, a granular partially deduplicated (granular partial recall) state, or a fully deduplicated state.

In one implementation, the deduplication mechanism 112 is implemented as a file system filter 120, with the granular partial recall mechanism 114 incorporated as a subcomponent (e.g., lines of software code) of the deduplication mechanism 112. As described herein, the granular partial recall mechanism 114 performs the various tracking operations, including maintaining tracking data, as to which ranges of a file are dirty and which remain in chunk store chunks.

One or more implementations of the aforementioned U.S. patent application Ser. No. 12/970,848 take advantage of the crash consistency guarantee offered by NTFS for the reparse point, using the reparse point for the recall range tracking. However, the size limitation of the reparse point, without more, allows for tracking recall ranges only at a relatively large granularity, which makes it inefficient in supporting scenarios that require frequent small writes to an optimized file.

Figure 2:
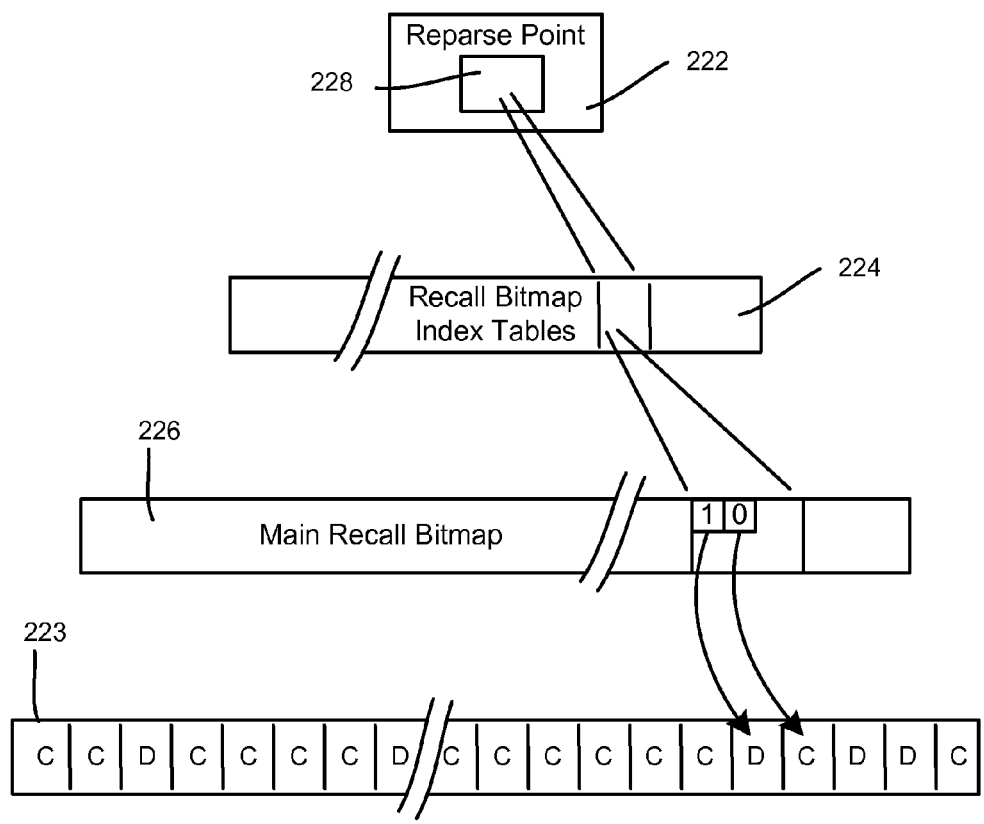
FIG. 2 is a representation of example hierarchical data structures that may be used to track more finely-grained recalled ranges of a relatively large file, according to one example embodiment.
Figure 3:
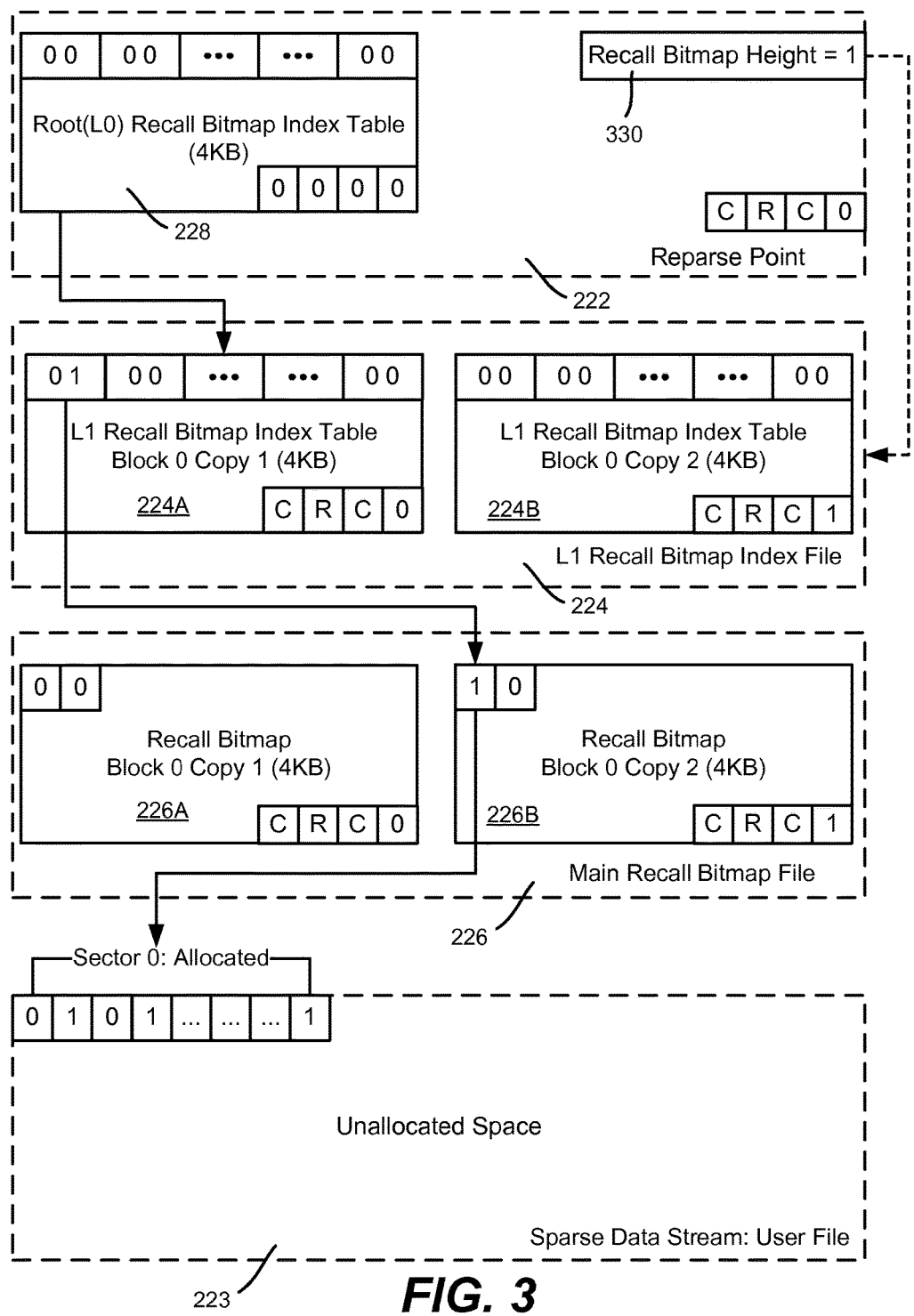
FIG. 3 is a further representation of example hierarchical data structures that may be used to track more finely-grained recalled ranges of a relatively large file, according to one example embodiment.

To improve the write performance for such scenarios, described herein is a technology that tracks the recall range at a finer granularity, as generally exemplified in FIGS. 2 and 3. In one implementation, a 512 byte or 4 KB granularity was chosen, based upon the I/O characteristics of (e.g., VDI) workloads, and because the majority of the I/Os are sector-aligned (and noncached), which is 4 KB by default for virtual hard disk files (or 512 B by default for legacy virtual hard disk files). Using 4 KB as the recall granularity also eliminates the need to read the original data in most cases for VDI as described above. Notwithstanding, any practical granularity may be used, and as can be readily appreciated, the mechanisms described herein are adaptable to other granularities.

To track the more numerous recall ranges corresponding to the finer granularity, one aspect described herein uses what is basically a larger recall bitmap. However, when used with finer granularity for files that are on the order of gigabytes or larger in size, such a larger recall bitmap cannot entirely fit in the reparse point 222, and thus one or more other data structures 224 and 226 external to the reparse point are used in one (e.g., NTFS-based) implementation. However, any data structures outside of the reparse point 222 do not have the crash consistency guarantee provided with the reparse point.

Further, having a single large bitmap consumes a large amount of memory, which is generally not needed as most of a file typically remains undirtied. Thus, described herein is using hierarchically arranged, multiple layers of bitmaps for a large file 223, with one bitmap, referred to as the recall unit 226 or main recall bitmap, tracking actual dirty ranges, with the other bitmaps, referred to as secondary bitmaps or recall bitmap index tables 224, tracking aggregated dirtied ranges at a much larger granularity. A root recall bitmap index table 228 remains small enough (4 KB) to fit in the reparse point. The main recall bitmap 226 and the intermediate recall bitmap index tables 224 reside on separate physical files because of their size, and hence are subject to various data corruption and data loss; protecting against corruption and loss are described below.

In one implementation, in the simplest form of two-layer recall bitmap, there is only one (root) recall bitmap index table and one main recall bitmap file 226 (there is no intermediate table or tables). With a 4 KB root recall bitmap index table 228, the two-layer recall bitmap allows tracking up to around $2^{29}$ recall granularity bytes, which is approximately 2 TB with a recall granularity of 4 KB. If the file is larger or becomes larger, and/or a different range granularity is used, another intermediate layer of recall bitmap index table is used so that the root index table does not overflow. A general idea is to not change (lower) the granularity once the recall bitmap is initialized and operational, because doing so involves very expensive processing of the existing dirty ranges and partial recalls, which are a result of (dirty) range collapse. Thus, for files that are too large to be tracked by the two-layer recall bitmap, intermediate recall bitmap index tables are used.

A disadvantage of having multiple layers of recall bitmap, including the two-layer ones, is extra read requests. However, the impact is generally negligible given that spatial locality has been a common trait in most (if not all) real world workloads, and access to the recall bitmap files is cached.

FIGS. 2 and 3 show a three-layer recall bitmap. To ensure data integrity and crash consistency for the hierarchical recall bitmap, the recall bitmap and recall bitmap index tables may be organized as generally shown therein. In this example, the recall bitmap and intermediate recall bitmap index tables are broken into blocks of 4 KBs with each block ending with a 4-byte CRC32 checksum. Thus, each block in the main recall bitmap file 226 can track up to (4096−4)*8*recall_size bytes of user data. Each block in the intermediate recall bitmap index file 224 can track up to a range of 128 MB ((4096−4)*8*4K) in the lower level recall bitmap index file.

Note that as shown in FIGS. 2 and 3, each block has two copies, and changes to the file are alternated between the two. The use of two copies is provided for crash consistency so that the structures do not end up with a stale bitmap due to torn writes. There is no fallback to from one copy to the other in the case of bit rots.

The root recall bitmap index table 228, which in this example is in the reparse point 222, tracks the active block copy in the recall bitmap index file 224. The root recall bitmap index table 228 is 4 KB that ends with four bytes of zero (0000) for padding. In one implementation optimization, two bits per block are allocated to track the block status for the next level recall bitmap file. Similarly, the recall bitmap index file 224 (in the active copy) tracks the active block copy in the recall bitmap 226.

Note that in this scheme, the recall granularity need never be changed after being set. Instead, if needed, the recall bitmap grows vertically, in that additional levels of intermediate recall bitmap index files are injected if the file size grows beyond what the current recall bitmap can accommodate. When growing a recall bitmap, the current height 330 of the recall bitmap (e.g., maintained as data in the reparse point 228) is incremented by one. A new index table file associated with the new height is populated with the old root index table, and a new root index table is created. Note that in an NTFS implementation, the root recall bitmap index table 228 and the recall bitmap index height 330 are part of the reparse point 222 of a deduplicated file, and thus these data are protected against crash-induced data inconsistency by NTFS.

With respect to on-disk structures, the main recall bitmap 226 is stored in an external file. The recall granularity is controlled by the optimization job and 4 KB is used in one implementation (e.g., in the VDI case) as 4 KB is the default sector size for virtual hard disk files. With this recall granularity, on-cached sector aligned writes in the virtual hard disk case do not require reading and writing of the original data.

With reference to the recall bitmap index file 224, unlike the reparse point 222 that is completely rewritten for each update, for a large bitmap the bitmap is updated partially. In order to detect corruptions in a bitmap, the bitmap is stored in (4 KB-4 B) units, each with a four byte CRC32 checksum. In other words, each unit, referred to as a recall bitmap block, takes up 4 KB of disk space in this example.

In addition to detecting corruption, the technology described herein prevents corruptions caused by torn writes and ensures that updates to the bitmap are crash consistent. To this end, there are two storage locations (copy 1 and copy 2 in FIG. 3) for each 4 KB recall bitmap block, also shown as 226A and 226B. Only one storage location is active, meaning that one copy contains the most current data, at any point of time. If location one (copy 1) is active, the next update goes to location two (copy 2) and then location two (copy 2) becomes active after the update completes successfully. If a crash occurs in the middle of the update, the data at location one (copy 1) remains valid because there was no write to location one (copy 1).

A separate table, the recall bitmap index table 224, is used to describe the following states of the recall bitmap blocks 224A and 224B (each block consuming two bits in the recall bitmap index table 224):

00b (zero decimal)—all bits in the block (except checksum) are zero (initial state)
01b (one decimal)—location zero (copy 1) active
10b (two decimal)—location one (copy 2) active
11b (three decimal)—all bits in the block (except the checksum) are one.

Note that the bits 00b and 11b allow knowing/setting the clean or dirty state at the higher data structure for a great deal of information in the lower data structure in the hierarchy, using only the two bits in the higher data structure.

Intermediate recall bitmap index tables are similarly stored in external files (e.g., the file 224). The intermediate recall bitmap index table 224 is broken into 4 KB blocks (224A and 224B) in the same way as the copies in the main recall bitmap files 226. A mapping from the recall bitmap index table level to the actual recall bitmap index table is maintained in the reparse point 222. As with the main recall bitmap blocks 226A and 226B, each recall bitmap index table has two storage locations (blocks 224A and 224B), and updates are alternated between the two. Similarly, index blocks are individually check-summed using CRC32.

An alternative to using recall bitmap index tables is to store an update sequence number, in addition to CRC32, for each recall bitmap block. The update sequence number is incremented each time the block is updated. When reading a block, both locations are read, and the one with a valid CRC checksum and higher update sequence number is used. However, this does not allow distinguishing between crash or bit rot induced corruptions; for example, it is possible that a bit flip occurs in the active location of the block, rendering the active copy invalid. With such an approach, the system falls back to the older and inaccurate copy and returns stale data to the user, causing undetected data corruptions.

With respect to file size, a reparse point has a maximum size of 16 KB, with 4 KB used for the root recall bitmap index table. Therefore, using 4 KB, the maximum size of a recall bitmap in a two-layer setup (or a recall bitmap index table) that can be tracked by the root index table is about 64 MB:

The maximum number of entries in recall bitmap index table is about 4 KB/2 bits=about 16K.
The maximum size of the recall bitmap file is about 16 KB*4 KB=about 64 MB.

With a recall size of 4,096 bytes, the maximum file size that can be tracked by the two-layer bitmap is approximately 2 TB:

Maximum file size: about 64M*8*4096 B=about 2 TB

For a VHD file around 128 GB, the recall bitmap file size is about 16 MB and the root recall bitmap index table size is about 1 KB. For files larger than about 2 TB, intermediate recall bitmap index table files may be used, or the recall granularity may be increased. Note that changing the recall granularity after the recall bitmap is initialized is possible, but a very expensive operation because collapsing recall ranges using a coarser recall granularity involves partially recalling the old data. For files that grow beyond the size limitation, if the recall bitmap cannot be reset (via a complete re-optimization), an option is to increase the recall bitmap height.

The table bellows shows approximate maximum file sizes supported by each recall bitmap height with a recall granularity of 4 KB.

| Recall Bitmap Height | Maximum File Size |
|---|---|
| 0 | Up to about 2 TB |
| 1 | Up to about 16 PB |
| 2 | Up to about 256 EB |
| ... | ... |

The table bellows shows approximate maximum file sizes supported by each recall granularity with a two-layer recall bitmap:

| Recall Size | Maximum File Size |
|---|---|
| 512 | Up to about 256 GB |
| 1024 | Up to about 512 GB |
| 2048 | Up to about 1 TB |
| 4096 | Up to about 2 TB |
| 8192 | Up to about 4 TB |
| ... | ... |

The table below shows an example file format:

| Description | Start Offset (inclusive) | End Offset (exclusive) |
|---|---|---|
| Header | 0 | 4 KB |
| Location 1 of metadata-block 1 | 4 KB | 8 KB |
| Location 2 of metadata-block 1 | 8 KB | 12 KB |
| Location 1 of metadata-block 2 | 12 KB | 16 KB |
| Location 2 of metadata-block 2 | 16 KB | 20 KB |
| ... | ... | ... |
| Location 1 of metadata-block N | (8 * N − 4) KB | 8 * N KB |
| Location 2 of metadata-block N | 8 * N KB | (8 * N + 4) KB |

The table below shows an example header format:

| Field | Description | Offset | Size |
|---|---|---|---|
| Signature | For easy debugging and inspecting on disk data issue Current value: 1. '_BRM' for main recall bitmap file //MRB_ 2. '_BRI' for recall bitmap index file //IRB_ | 0 | 4 bytes |
| MajorVersion | Major version Current value: 1 | 4 | 1 byte |
| MinorVersion | Minor version Current value: 1 | 5 | 1 byte |
| VersionChecksum | Checksum of the MajorVersion and MinorVersion Current value: 0x0101 | 6 | 2 bytes |
| ContainerId | Container Id of the starting stream map chunk of the Dedup file | 8 | 4 bytes |
| LocalId | Local Id of the starting stream map chunk of the Dedup file | 12 | 4 bytes |
| HashInfo | The random value of the stream map of the Dedup file | 16 | 32 bytes |
| Reserved | Reserved for future use | 48 | 4044 bytes |
| Checksum | CRC32 checksum of the header structure | 4092 | 4 bytes |

The table below shows an example block format:

| Field | Description | Offset | Size |
|---|---|---|---|
| Bitmap | Recall ranges tracking | 0 | 4092 bytes |
| Checksum | CRC32 checksum of the bitmap | 4092 | 4 bytes |

Turning to another aspect, namely delayed flush, the recall bitmap need not be persisted immediately after the partial recall is completed, but rather the system may do it lazily. With a five second delay, this provides almost a forty percent improvement increase in terms of IOPs, for example. The risk however is that any unflushed metadata may lead to user data loss, possibly unexpectedly.

Recall bitmap changes are flushed based upon user/program requests, e.g., as part of the contract of the interface. As the majority of the writes issued in the VHD case are noncached, non-write-through, they are subject to loss if the disk write cache is not flushed in time. Therefore, the VHD parser issues flushes at appropriate points in time, which eliminates the need of having a delayed timer.

Write-through I/Os are persisted on the disk before they are completed. The recall bitmap is flushed in-place synchronously. Flushing also occurs in conjunction with file close, flush volume, lock volume and dismount volume. Any pending/delayed recall bitmap updates are flushed out before the request is forwarded to the file system. Note that lock volume also includes opening a volume handle with exclusive access.

In theory it is acceptable to delay flushing the recall bitmap for cached writes and non-cached non-write-through writes indefinitely (unless the disk does not report having a write cache) without having to be concerned about breaking the contract. Notwithstanding, a more aggressive approach that periodically flushes the recall bitmap in used in one implementation.

Figure 4:
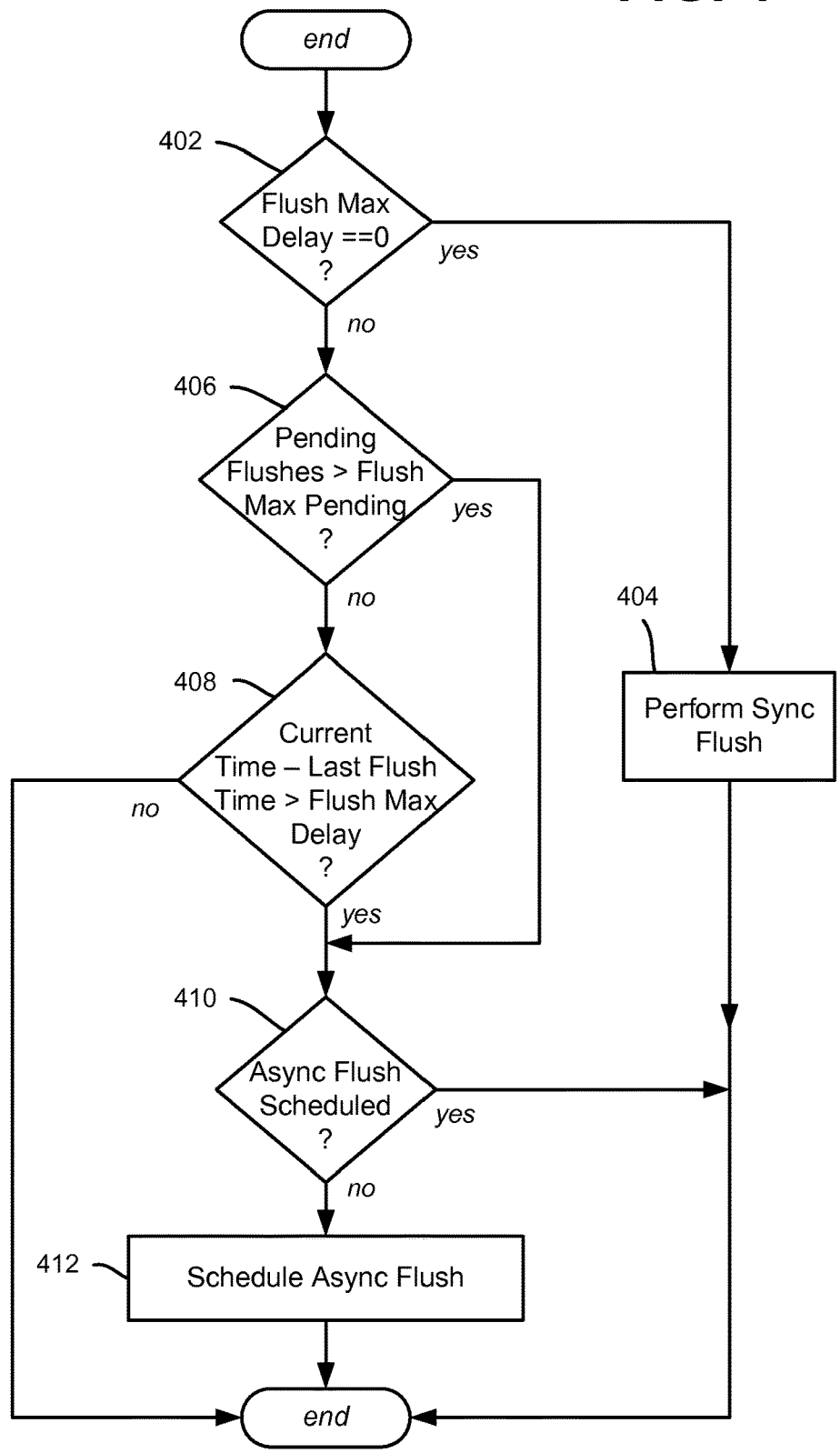
FIG. 4 is a flow diagram representing example steps of a delayed flush operation, according to one example embodiment.

FIG. 4 shows example steps that may be taken with respect to delayed flushing, including a periodic flushing approach. At step 402, a check is made as to whether delayed flushing is turned off, e.g., the maximum delay time is set to zero by user or program command, which may occur with write through caching, for example. If so, step 404 is executed to perform the flush without delay. Otherwise, step 402 branches to step 406.

At step 406, the number of pending flushes is evaluated against a threshold maximum; if so, step 406 advances to step 410 as described below. If not, step 408 is executed, which checks the whether the flush delay has been reached based upon the current time and the last flush time; (note that the time is configurable, and, for example may be five seconds, thirty seconds and so on as a chosen tradeoff between crash protection and efficiency). If not, step 408 ends the process, basically waiting until the number of pending flushes exceeds the maximum number or the wait time is reached.

If either the number of pending flushes exceeds the maximum number or the wait time is reached, step 410 determines whether an asynchronous flush is already scheduled. If so nothing needs to be done; if not, step 412 schedules an asynchronous flush. Note that file data is flushed first, then metadata, so that if a crash occurs in between, the original metadata remains intact and restores the previous file state.

Figure 5:
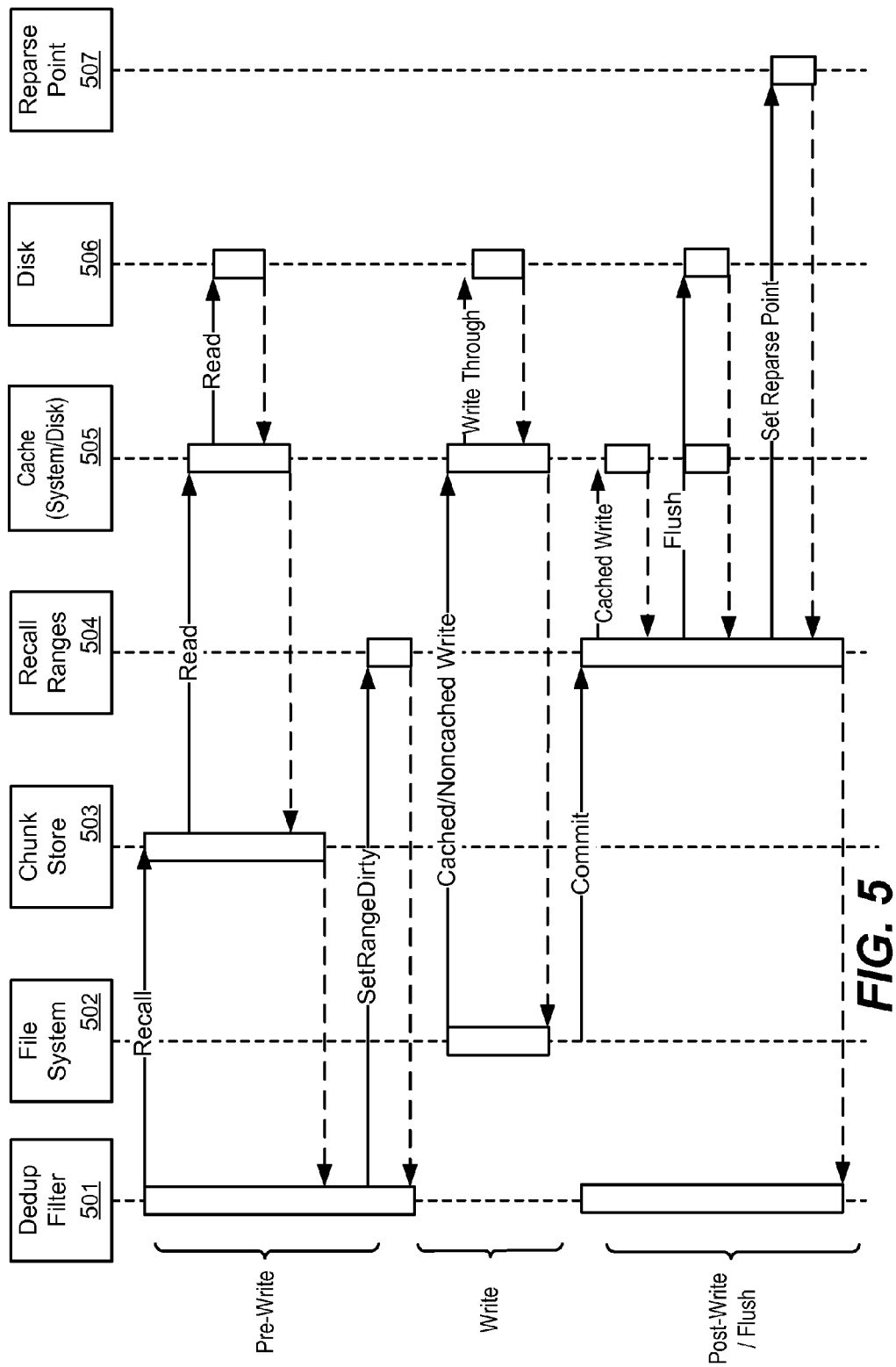
FIG. 5 is a representation of components and operations involved in a delayed flush that flushes written data from memory to disk while preserving data-integrity and crash-consistency, according to one example embodiment.

FIG. 5 shows various components 501-507 and their communication/data flow with respect to data writes. As can be seen, before a write to a range, the deduplication filter recalls data from the chunk store, where it is read from the cache or disk. When read back, the range is marked as dirty in the bitmap structures described above. The write to the cache (or disk if write through is on) then takes place.

Post write operations and flushing (which may be delayed) then occur when the data is committed. Caching until flushing is allowed as described above, with the reparse point set after flushing.

Turing to another aspect, namely the optimization of open files, in general, the same bitmap structures may be used to track whether part of a file is dirty, and whether part of a file has been truncated (zeroed, with the data moved to the chunk store). As will be understood, dirty parts of a file cannot be truncated, that is writes are left in the file.

Figure 6A:
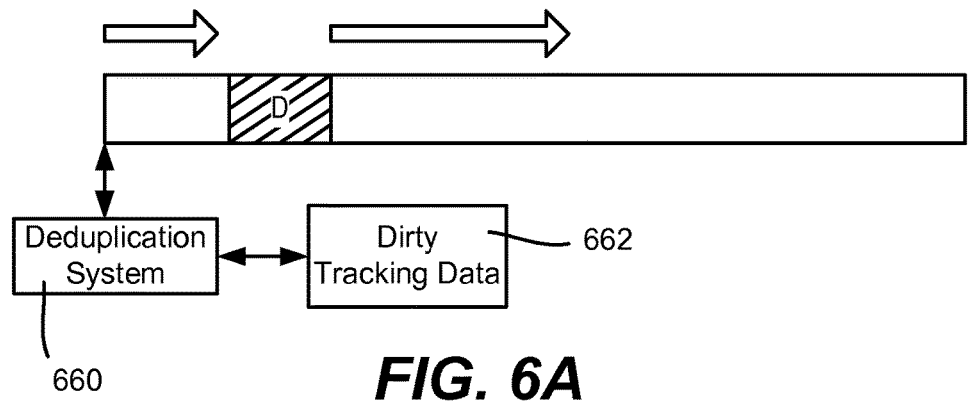
FIGS. 6A-6C are representations of optimizing a file while open for writes, according to one example embodiment.
Figure 6B:
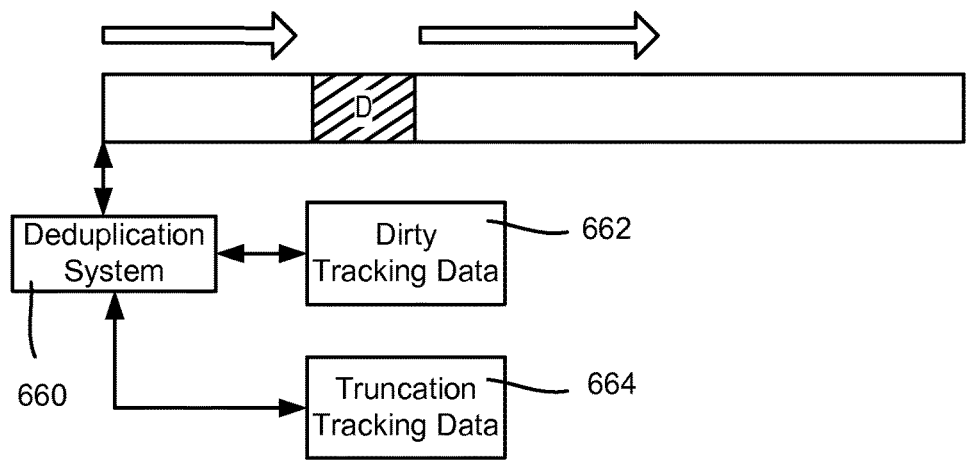

FIG. 6A shows how an optimization occurs for a file that has not previously been optimized. In general, writes need to be tracked, as a deduplication system 660 processes the file so that those dirtied region or regions (the ranges written while the file is being optimized, e.g., D) are not truncated. Truncation prepares the chunks in the chunk store, but only commits them at the same time, so that truncation occurs basically all at once for chunks of the entire file or for some subsection of the file (e.g., in one gigabyte or two gigabyte increments). At commit time, any region marked dirty is not truncated. A dirty tracking data structure 662 is used for this purpose, and because the aforementioned data structures of FIGS. 1-3 already have this data, the deduplication system may use the existing data structures for this purpose as well.

For a file that previously has been optimized, but has some data partially recalled, a secondary, truncation data structure 664 is used. The secondary data structure 664 allows for distinguishing between writes that occur before optimization processing of a region and writes that occur after. Writes that occur before are optimized at the truncation commit (as they will not be clean following truncation), however writes that occur after need to remain dirty in the file.

Note that optimization may occur on subparts of a file, e.g., in two gigabyte portions. This is referred to as a continuation optimization. Dirtied regions previous to the current subpart being optimized are not of a concern, as they will need to wait for another optimization.

Figure 6C:
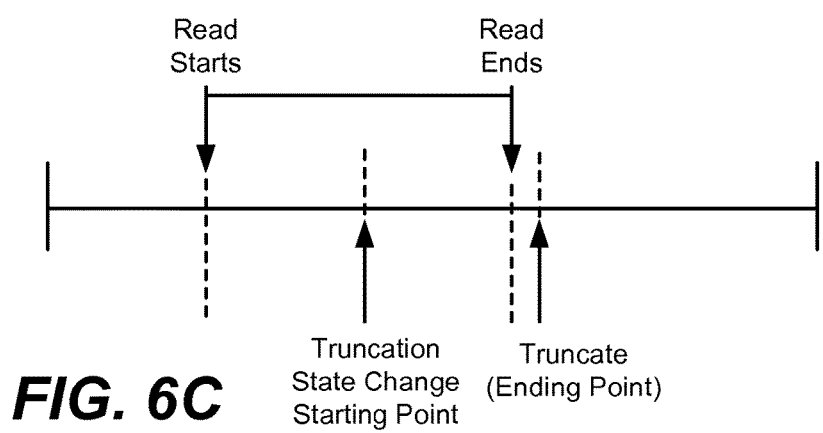

With respect to servicing reads, until the time of commit, reads may continue as normal, e.g., from the file stream. At the time of truncation, reads for regions that are optimized then need to be from the chunk store because the file stream is zeroed for those regions. However, in theory, a read request may begin before the time of truncation, but not complete. However, a point in time before truncation is used as a truncation state change starting point, and the file stream data not zeroed until a truncation ending point is reached. FIG. 6C shows this via a timing diagram with a upward arrow showing the state change starting point, and another showing the truncate (the ending point), with downward arrows showing an example read start and end. Between the time of the truncation starting point and truncate ending point, the data in the chunk store is committed and correct, but the file stream data is not yet zeroed. Reads that have started before the starting point are allowed to complete before the truncation ending (data zeroing) point occurs, that is truncation defers until those reads complete. In this way, the reads will get correct data. Reads that occur after the state change starting point go to the chunk store which now contains correct data (plus any file stream data that is marked dirty and will not be zeroed). A counter is used to track outstanding read requests that occur before the truncation starting point, and when the counter reaches zero as decremented upon each read completion, the truncation ending point occurs. However, two counters are used, one active for the "before starting point" reads and one counting reads for "after starting point reads" because these "after" reads will become the next "before" reads as soon as the truncation ending point is reached, that is, the counters are swapped with one another such that the "after" counter now becomes the active "before" counter, and vice-versa.

Figure 7:
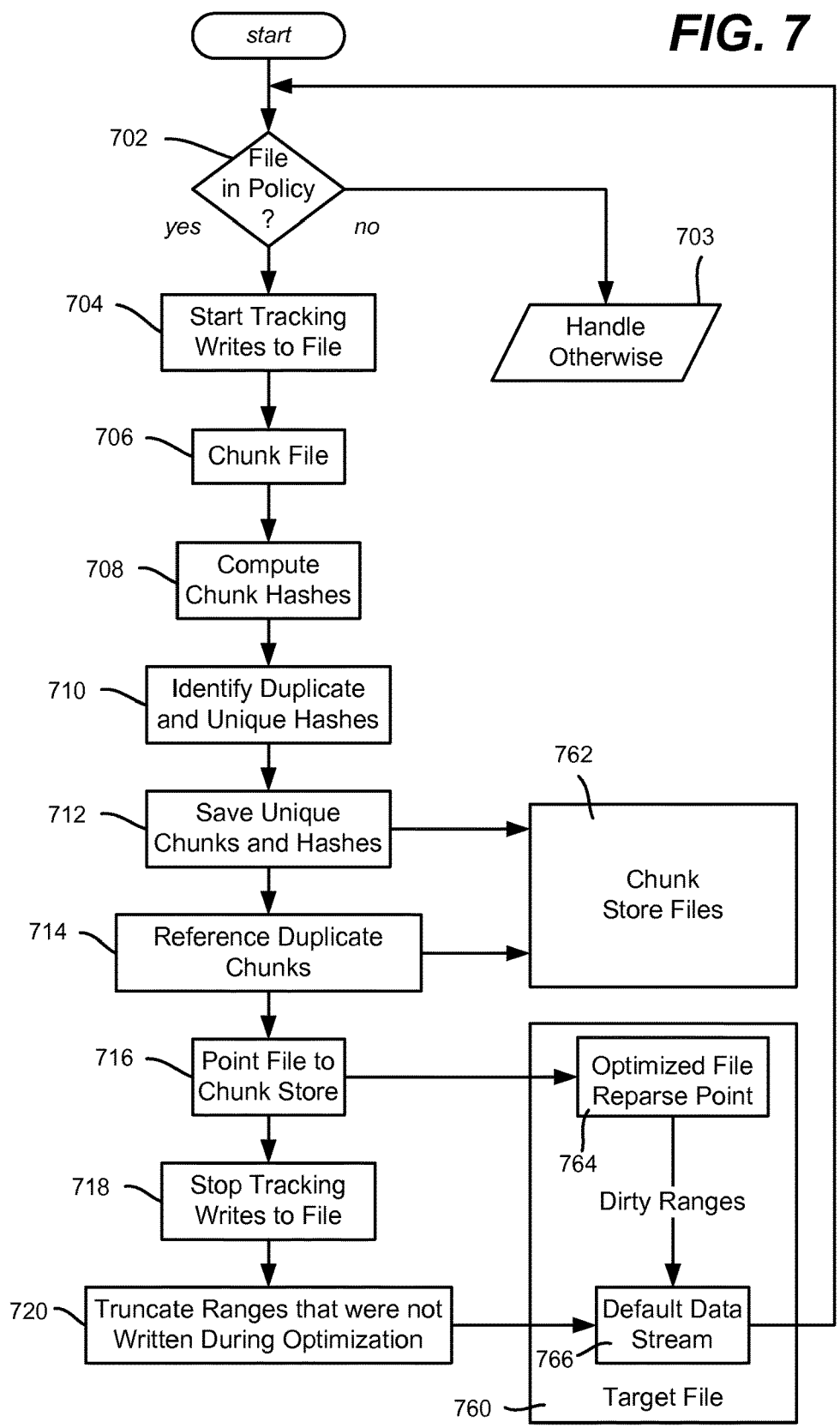
FIG. 7 is a flow diagram representing how a file may be optimized while open for writes, according to one example embodiment.

Various example steps of the deduplication optimization process are represented in FIG. 7. As will be understood, steps 704, 718 and 720 are provided to support the optimizing of files with open handles.

Step 702 determines whether a file being considered for optimization meets optimization policy criteria; if not, step 703 represents handling that file in some other way, which may be simply to skip the file. Otherwise, the file 760 is a target file to be optimized, and step 702 continues to step 704.

By allowing changes to the file (via the open handle) during the optimization, some of the changes made between a starting time $t_{start}$ and ending time $t_{end}$ are reflected in the chunk store 762, while others will not. Deleting the file's primary data stream would therefore lose some changes. In order to prevent losing the changes, the parts of the primary data that were changed between $t_{start}$ and $t_{end}$ need to be maintained, and thus only the parts of the file that did not change can be truncated (that is, replaced with references to chunks in the chunk store).

To do this, the deduplication filter tracks the changes that happen between $t_{start}$ and $t_{end}$, as generally represented by step 704, which starts tracking writes to the file. Note that the deduplication filter is used because the filter is also the place where the primary data stream of files is truncated after optimization. Note further that changes only need to be tracked for a file if that particular file is being optimized. Therefore, the deduplication system notifies the filter before the deduplication system starts optimizing any file.

Optimizing (or re-optimizing) a file proceeds in the typical manner, e.g., during optimization the file is read sequentially and its data is stored as chunks in the chunk store 762 as generally represented by steps 708-716. When optimization finishes at the time $t_{end}$, the file 760 (its data) is replaced by a reparse point 764 and the file's primary data stream is deleted (zeroed). Note this process works the same for first time optimization as well as re-optimization of a previously optimized file.

The filter stops tracking writes after the reparse point is updated by the deduplication system, as generally represented by step 718.

Thus, the optimization systems send down a notification to the deduplication filter before it begins optimizing a file (that is, before it starts reading and chunking the file). The receipt of this notification causes the filter to start tracking writes that file at step 704. Upon receiving the deduplication the filter tags the stream handle context by setting a relevant flag on it. This way, in the process crashes, the filter detects this during handle cleanup so proper cleanup can be performed (including stopping the tracking of writes).

Written ranges are tracked in memory. If there is a crash, the information is lost, but this is not problematic as optimization needs to start over anyway. The written ranges (offset, length) are scaled to the recall (bitmap) granularity and stored in a data structure (like recalled/data ranges). A pointer to the data structure is added to the stream context. If this pointer is NULL, this indicates that ranges are not tracked for the given file (default).

The write tracking remains active until after the reparse point of the file has been updated, which is known via another notification sent to the deduplication filter. The file maintains the ranges in its data stream 766 that were written, as these are not truncated (step 720). The write tracking is usually done is in a pre-write state except for writes that started before the filter began tracking writes; those writes are tracked in a post write state. Writes are tagged in order to tell whether they were tracked or not.

When there is a write in the pre-write state, the written ranges are updated in the following places:
 If the range is already dirty (recalled), then the filter sends down the write to the file system. In this case the range is marked as written when the range state check is done.
 If the range is clean and the write is aligned to the recall size, then the range is marked written in the same place where the range is marked dirty. This will happen atomically (while holding the file's stream context lock).
 If the range is clean and non-aligned then a recall happens first. The range as written is updated in the copy-on-write thread when the recall is performed, again, atomically.

Using the above strategy, there is not a situation where a range is marked dirty but not written within the area of the file that is being optimized.

| Range "dirty" or "clean" | Write was tracked for range or not | Meaning |
|---|---|---|
| Clean | Yes | Not possible |
| Clean | No | This range was already optimized before. It can be truncated (if not truncated already). |
| Dirty | Yes | Range cannot be truncated (received write during optimization). |
| Dirty | No | Range was optimized, can be truncated. |

In the case of first time optimization or continuation, the system may perform a partial commit, e.g., approximately every one gigabyte. As part of the partial commit the reparse point is updated, and the file's primary data stream is truncated (set to zero data) up to the point in the file that is backed in the chunk store. This enables a valuable optimization for write tracking, namely, instead of tracking writes from the beginning of the file to the commit offset, the system only needs to track writes from the previous commit offset to the new commit point (the distance between commit points is approximately 1 GB). Because the commit offset is unknown prior to commit, it may be approximated it by multiplying the registry knobs for maximal chunks per session and maximal chunk size (by default this is 2 GB).

During re-optimization there currently is no "real" partial commit. That is, the reparse point cannot be updated until re-optimization gets to the file offset up to which the file is backed by the chunk store (which is the end of the file unless it has been extended). Consequently, the file's primary data stream cannot be truncated during re-optimization. Truncation happens once the commit point passes the size backed by the chunk store. This means the filter needs to track writes from the beginning of the file to the commit point (which uses more memory).

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 8:
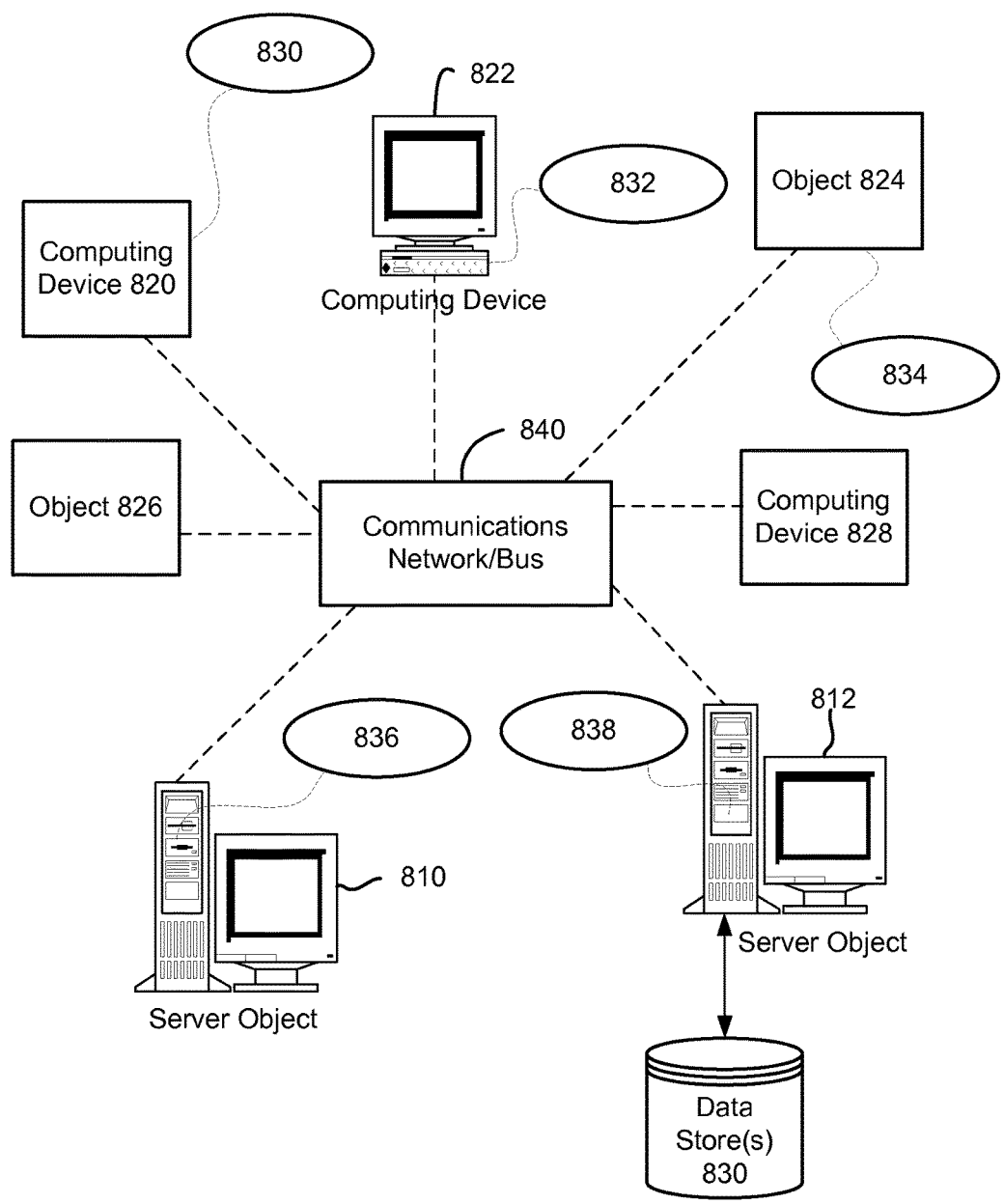
FIG. 8 is a block diagram representing example non-limiting networked environments in which various embodiments described herein can be implemented.

FIG. 8 provides a schematic diagram of an example networked or distributed computing environment. The distributed computing environment comprises computing objects 810, 812, etc., and computing objects or devices 820, 822, 824, 826, 828, etc., which may include programs, methods, data stores, programmable logic, etc. as represented by example applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing object or device 820, 822, 824, 826, 828, etc. can also contain an application, such as applications 830, 832, 834, 836, 838, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc., acting as servers provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 840 or bus is the Internet, for example, the computing objects 810, 812, etc. can be Web servers with which other computing objects or devices 820, 822, 824, 826, 828, etc. communicate via any of a number of known protocols, such as the hypertext transfer protocol (HTTP). Computing objects 810, 812, etc. acting as servers may also serve as clients, e.g., computing objects or devices 820, 822, 824, 826, 828, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 9 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
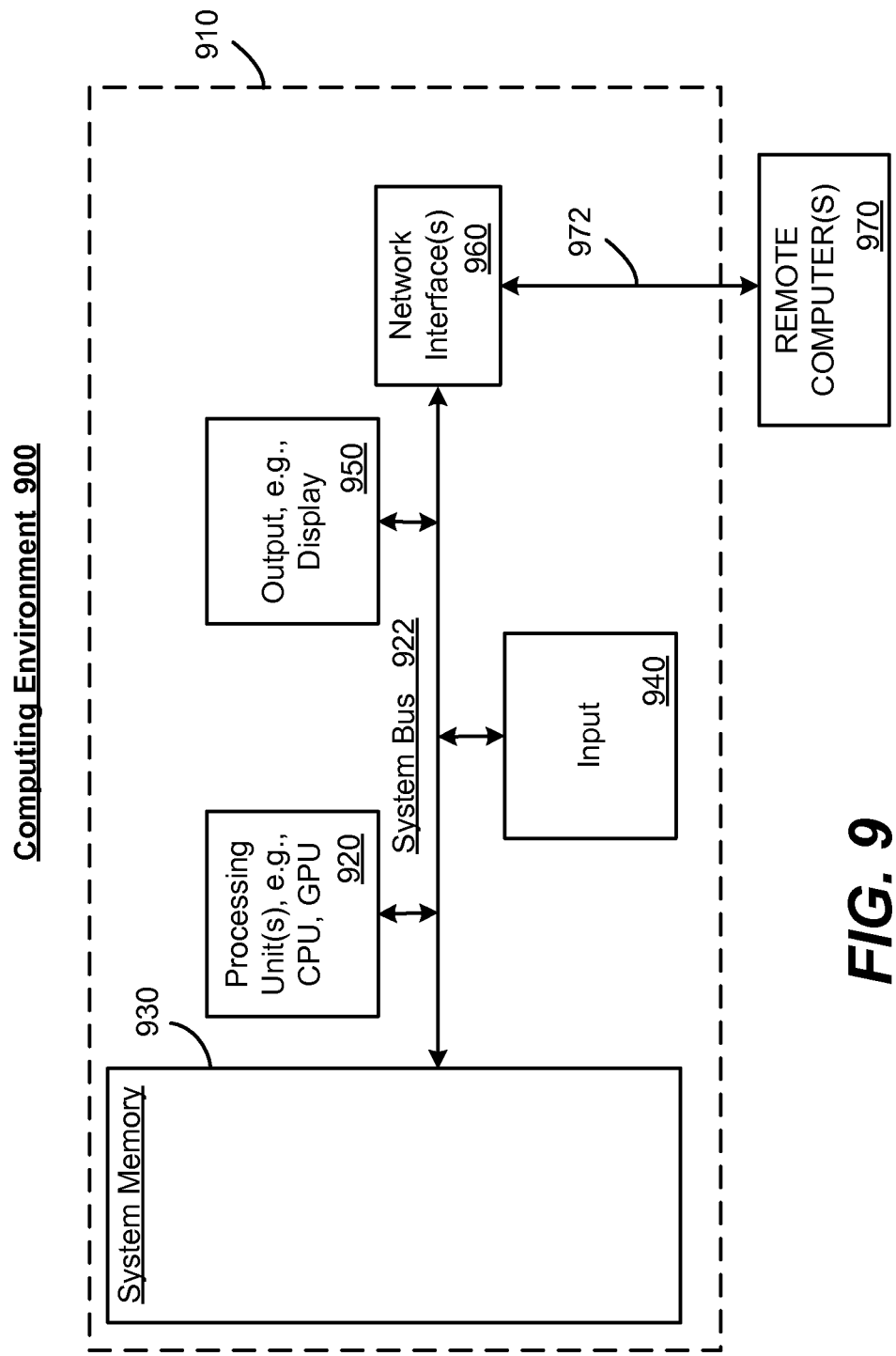
FIG. 9 is a block diagram representing an example non-limiting computing system or operating environment in which one or more aspects of various embodiments described herein can be implemented.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. In addition, the computing system environment 900 is not intended to be interpreted as having any dependency relating to any one or combination of components illustrated in the example computing system environment 900.

With reference to FIG. 9, an example remote device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A computing device comprising:
one or more processing units; and
one or more computer-readable media comprising computer-executable instructions, which, when executed by the one or more processing units, cause the computing device to:
detect a writing of data into a deduplicated file that comprises references to chunks of data in a chunk store; and
separately modify, in response to the detecting, each of at least two different data structures that are hierarchically arranged, wherein the computer-executable instructions that cause the computing device to perform the separate modifications comprise computer-executable instructions that cause the computing device to:
modify one or more entries in a main recall table to identify as dirty one or more ranges of data of the deduplicated file that comprise the written data, wherein the main recall table is a hierarchically lower one of the at least two different data structures such that each of the one or more entries in the main recall table identifies whether a corresponding single one of the one or more ranges of data of the deduplicated file is either clean or dirty; and
modify one or more entries in a recall index table to identify one or more blocks of multiple entries in the main recall table as comprising at least one entry identifying that a corresponding range of data of the deduplicated file is dirty, wherein the recall index table is a hierarchically higher one of the at least two different data structures such that a single entry of the recall index table identifies whether a corresponding block of multiple entries in the main recall table either comprises only entries that identify corresponding ranges of data of the deduplicated file as clean, or includes at least one entry that identifies a corresponding range of data of the deduplicated file as dirty;
wherein a deduplicated file metadata that is stored as part of a file structure of the deduplicated file comprises a root recall index table; and
wherein further the main recall table is stored externally to the deduplicated file metadata that is stored as part of the file structure of the deduplicated file.

2. The computing device of claim 1, wherein, if the single entry of the recall index table identifies that the corresponding block of multiple entries in the main recall table includes the at least one entry that identifies the corresponding range of data of the deduplicated file as dirty, then the single entry of the recall index table comprises an identification of which copy of the main recall table is currently active; and wherein further the modifying the one or more entries in the main recall table comprises modifying one or more entries in alternating copies of the main recall table such that a last-modified copy of the main recall table is the currently active copy of the main recall table as identified by entries of the recall index table.

3. The computing device of claim 1, wherein the single entry of the recall index table further identifies whether the corresponding block of multiple entries in the main recall table comprises only entries that identify the corresponding ranges of data of the deduplicated file as dirty.

4. The computing device of claim 1, wherein a single entry of the root recall index table corresponds to a block of multiple entries of the recall index table in a hierarchically same manner as the single entry of the recall index table corresponds to the block of multiple entries of the main recall table.

5. The computing device of claim 1, wherein the root recall index table is stored in a reparse point of the deduplicated file.

6. The computing device of claim 1, wherein the computer-readable media comprise further computer-executable instructions which, when executed by the one or more processing units, cause the computing device to:
increment an update sequence number after each modifying of the main recall table.

7. The computing device of claim 1, wherein changes to at least one of the main recall table or the recall index table are flushed to disk only after a delay of a predetermined duration.

8. The computing device of claim 1, wherein changes to at least one of the main recall table or the recall index table are flushed to disk upon at least one of: a file flush, a volume flush, a file handle close, or a write-through file modification.

9. The computing device of claim 1, wherein the computer-readable media comprise further computer-executable instructions which, when executed by the one or more processing units, cause the computing device to:
modify a second main recall table to identify as dirty one or more other ranges of data of the deduplicated file that comprise the data written by a second, subsequent writing of data into the deduplicated file; and
modify a second recall index table to identify one or more blocks of multiple entries in the main recall table as comprising at least one entry identifying that a corresponding range of data of the deduplicated file is dirty;
wherein the second main index table and the second recall index table are hierarchically arranged such that the second main recall table is hierarchically lower and the second recall index table is hierarchically higher; and
wherein further the second main index table and the second recall index table provide for distinguishing between writes that occur before optimization processing of a region of the deduplicated file and writes that occur after the optimization processing of the region of the deduplicated file.

10. The computing device of claim 1, wherein the computer-readable media comprise further computer-executable instructions which, when executed by the one or more processing units, cause the computing device to:
receive a request for a first read of data that is to be truncated as part of a deduplication optimization, the request for the first read being received prior to a truncation start;
increment a first counter in response to a commencement of the first read, the first read obtaining data from the file structure of the deduplicated file;
decrement the first counter in response to the first read completing;
receive a request for a second read of data that is also to be truncated as part of the deduplication optimization, the request for the second read being received subsequent to the truncation start;
leave the first counter unchanged in response to a commencement of the second read, the second read obtaining data from the chunk store; and
delay truncation until the first counter is zero, the truncation comprising zeroing out the data being truncated such that the file structure of the deduplictaed file instead comprises pointers to chunks in the chunk store for the data that was truncated.

11. A method of partially deduplicating data files at a finer granularity to increase data access performance, the method comprising:
detecting a writing of data into a deduplicated file that comprises references to chunks of data in a chunk store;
separately modifying, in response to the detecting, each of at least two different data structures that are hierarchically arranged, wherein the separately modifying comprises:
modifying one or more entries in a main recall table to identify as dirty one or more ranges of data of the deduplicated file that comprise the written data, wherein the main recall table is a hierarchically lower one of the at least two different data structures such that each of the one or more entries in the main recall table identifies whether a corresponding single one of the one or more ranges of data of the deduplicated file is either clean or dirty; and
modifying one or more entries in a recall index table to identify one or more blocks of multiple entries in the main recall table as comprising at least one entry identifying that a corresponding range of data of the deduplicated file is dirty, wherein the recall index table is a hierarchically higher one of the at least two different data structures such that a single entry of the recall index table identifies whether a corresponding block of multiple entries in the main recall table either comprises only entries that identify corresponding ranges of data of the deduplicated file as clean, or includes at least one entry that identifies a corresponding range of data of the deduplicated file as dirty;
wherein a deduplicated file metadata that is stored as part of a file structure of the deduplicated file comprises a root recall index table; and
wherein further the main recall table is stored externally to the deduplicated file metadata that is stored as part of the file structure of the deduplicated file.

12. The method of claim 11, wherein, if the single entry of the recall index table identifies that the corresponding block of multiple entries in the main recall table includes the at least one entry that identifies the corresponding range of data of the deduplicated file as dirty, then the single entry of the recall index table comprises an identification of which copy of the main recall table is currently active; and wherein further the modifying the one or more entries in the main recall table comprises modifying one or more entries in alternating copies of the main recall table such that a last-modified copy of the main recall table is the currently active copy of the main recall table as identified by entries of the recall index table.

13. The method of claim 11, wherein a single entry of the root recall index table corresponds to a block of multiple of the recall index table in a hierarchically same manner as the single entry of the recall index table corresponds to the block of multiple entries of the main recall table.

14. The method of claim 11, wherein the root recall index table is stored in a reparse point of the deduplicated file.

15. The method of claim 11, further comprising:
modifying a second main recall table to identify as dirty one or more other ranges of data of the deduplicated file that comprise the data written by a second, subsequent writing of data into the deduplicated file; and
modifying a second recall index table to identify one or more blocks of multiple entries in the main recall table as comprising at least one entry identifying that a corresponding range of data of the deduplicated file is dirty;
wherein the second main index table and the second recall index table are hierarchically arranged such that the second main recall table is hierarchically lower and the second recall index table is hierarchically higher; and
wherein further the second main index table and the second recall index table provide for distinguishing between writes that occur before optimization processing of a region of the deduplicated file and writes that occur after the optimization processing of the region of the deduplicated file.

16. The method of claim 11, further comprising:
receiving a request for a first read of data that is to be truncated as part of a deduplication optimization, the request for the first read being received prior to a truncation start;
incrementing a first counter in response to a commencement of the first read, the first read obtaining data from the file structure of the deduplicated file;
decrementing the first counter in response to the first read completing;
receiving a request for a second read of data that is also to be truncated as part of the deduplication optimization, the request for the second read being received subsequent to the truncation start;
leaving the first counter unchanged in response to a commencement of the second read, the second read obtaining data from the chunk store; and
delaying truncation until the first counter is zero, the truncation comprising zeroing out the data being truncated such that the file structure of the deduplictaed file instead comprises pointers to chunks in the chunk store for the data that was truncated.

17. The computing device of claim 1, wherein the recall index table is the root recall index table.

18. The method of claim 11, wherein the single entry of the recall index table further identifies whether the corresponding block of multiple entries in the main recall table comprises only entries that identify the corresponding ranges of data of the deduplicated file as dirty.

19. A computing device comprising:
one or more processing units; and
one or more computer-readable media comprising computer-executable instructions, which, when executed by the one or more processing units, cause the computing device to:
receive a request to read a first set of data from a file that is only partially deduplicated, the file comprising: (1) pointers to chunks of data stored externally to the file in a chunk store and (2) dirtied file data comprising data that was changed after the file was last deduplicated into the chunks of data;
determine from which portion of a file system to obtain the first set of data, in response to the request, by referencing a set of recall tables that are hierarchically arranged, the set of recall tables comprising:
a main recall table that is a hierarchically lower table of the set of recall tables, wherein each entry of the main recall table identifies whether a corresponding range of data of the file is either clean or dirty; and
a recall index table that is a hierarchically higher table of the set of recall tables, wherein each entry of the recall index table identifies whether a corresponding block of multiple entries in the main recall table either comprises only entries that identify corresponding ranges of data of the file as clean, or includes at least one entry that identifies a corresponding range of data of the file as dirty;

source, in response to the read request, a first subset of the first set of data from the dirtied file data stored with the file if the set of recall tables indicate that the first subset is dirty; and source, in response to the read request, a second subset of the first set of data from one or more of the chunks of data stored externally to the file if the set of recall tables indicate that the second subset is clean.

20. The computing device of claim 19, wherein a root recall index table, being a hierarchically highest table of the set of recall tables, is stored in a reparse point of the file, and wherein further either the recall index table is the root recall index table, or a single entry of the root recall index table corresponds to a block of multiple entries of the recall index table in a hierarchically same manner as the single entry of the recall index table corresponds to the block of multiple entries of the main recall table.

\* \* \* \* \*